US009640874B2

(12) United States Patent
Lu et al.

(10) Patent No.: US 9,640,874 B2
(45) Date of Patent: May 2, 2017

(54) SINGLE RADIO FREQUENCY DOUBLE-STREAM TRANSMISSION APPARATUS, USE METHOD AND ANTENNA SYSTEM

(71) Applicant: Huawei Technologies Co., Ltd., Shenzhen (CN)

(72) Inventors: Weishan Lu, Shenzhen (CN); Tao Wu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 32 days.

(21) Appl. No.: 14/744,755

(22) Filed: Jun. 19, 2015

(65) Prior Publication Data

US 2015/0288076 A1 Oct. 8, 2015

Related U.S. Application Data

(63) Continuation of application No. PCT/CN2013/090109, filed on Dec. 20, 2013.

(30) Foreign Application Priority Data

Dec. 20, 2012 (CN) .......................... 2012 1 0558427

(51) Int. Cl.
*H01Q 21/06* (2006.01)
*H01Q 3/44* (2006.01)
(Continued)

(52) U.S. Cl.
CPC ............. *H01Q 21/06* (2013.01); *H01Q 3/446* (2013.01); *H01Q 5/314* (2015.01); *H01Q 5/385* (2015.01);
(Continued)

(58) Field of Classification Search
None
See application file for complete search history.

(56) References Cited

U.S. PATENT DOCUMENTS 7,391,386 B2 * 6/2008 Sawaya ............... H01Q 1/2266
343/745
2002/0132581 A1 9/2002 Ichihara
(Continued)

FOREIGN PATENT DOCUMENTS

CN 102365788 A 2/2012
JP 2006-238225 A 9/2006
(Continued)

OTHER PUBLICATIONS

Kotecha, J. et al., LTE: MIMO Techniques in 3GPP-LTE, Freescale Technology Forum, Nov. 2008, Freescale Semiconductor Inc.*
(Continued)

*Primary Examiner* — Howard Williams
(74) *Attorney, Agent, or Firm* — Brinks Gilson & Lione

(57) ABSTRACT

Embodiments of the present disclosure provide a single radio frequency double-stream transmission apparatus, wherein the apparatus includes: a radio frequency link, a reactance control circuit, a parasitic reactor, an active antenna and an even number M of parasitic antennas, wherein M is larger than 2; the radio frequency link is configured to generate a radio frequency signal; the active antenna is connected with the radio frequency link, the parasitic antennas are respectively connected with the parasitic reactor, the distances from the parasitic antennas to the active antenna are the same, and the radian between adjacent parasitic antennas is (Continued)

$\frac{360}{M}$ degrees;

the parasitic reactor may be adjusted by the reactance control circuit to make the reactance values of any pair of parasitic antennas in mirror symmetry via the active antenna be different and the reactance values of the rest pairs of parasitic antennas in mirror symmetry via the active antenna be equal respectively.

12 Claims, 8 Drawing Sheets

(51) Int. Cl.
    H01Q 19/32      (2006.01)
    H01Q 5/314      (2015.01)
    H01Q 5/385      (2015.01)
    H01Q 21/20      (2006.01)
    H04B 7/04       (2006.01)
    H04B 7/0413     (2017.01)

(52) U.S. Cl.
    CPC ............ H01Q 19/32 (2013.01); H01Q 21/20 (2013.01); H04B 7/0413 (2013.01)

(56) References Cited

U.S. PATENT DOCUMENTS

2010/0277370 A1  11/2010  Park et al.
2012/0038538 A1   2/2012  Hanazawa et al.

FOREIGN PATENT DOCUMENTS

JP      2007-221523 A      8/2007
WO   WO 2011/058378 A1    5/2011

OTHER PUBLICATIONS

Alrabadi, Osama N. et al., "A Universal Encoding Scheme for MIMO Transmission Using a Single Active Element for PSK Modulation Schemes," IEEE Transactions on Wireless Communications, vol. 8, No. 10, Oct. 2009, pp. 5133-5143.

Alrabadi, Osama N. et al., "MIMO Transmission Using a Single RF Source: Theory and Antenna Design," IEEE Transactions on Antennas and Propagation, vol. 60, No. 2, Feb. 2012, pp. 654-664.

Barousis, Vlasis et al., "A Stochastic Beamforming Algorithm for ESPAR Antennas," IEEE Antennas and Wireless Propagation Letters, vol. 7, 2008, pp. 745-748.

\* cited by examiner

SINGLE RADIO FREQUENCY DOUBLE-STREAM TRANSMISSION APPARATUS, USE METHOD AND ANTENNA SYSTEM

CROSS-REFERENCE TO RELATED APPLICATIONS

This application is a continuation of International Application No. PCT/CN2013/090109 filed on Dec. 20, 2013, which claims priority to Chinese Patent Application No. 201210558427.4, filed on Dec. 20, 2012, both of which are hereby incorporated by reference in their entireties.

FIELD OF THE DISCLOSURE

The present disclosure relates to the technical field of communications, and particularly, to a single radio frequency double-stream transmission apparatus, a use method and an antenna system.

BACKGROUND OF THE DISCLOSURE

By adopting MIMO (Multiple Input and Multiple Output) technology, an additional spatial degree of freedom may be generated to exponentially increase system capacity. According to theories and practices, with linear increase of the number of transmitting and receiving antennas, MIMO system capacity also increases linearly, thereby greatly enhancing utilization efficiency of a frequency spectrum. Therefore, the MIMO technology has been widely used in existing wireless communication systems, for example, Wi-Fi (Wireless Fidelity), WCDMA (Wideband Code Division Multiple Access), LTE (long Term Evolution) and the like.

However, the conventional MIMO technology requires that each antennas needs one RF (Radio Frequency) link, to transmit different data streams on different antennas, so the cost is relatively large. On the other hand, in order to ensure independent fading characteristics (i.e., a channel matrix is at a good state) of a wireless channel, wavelength between the transmitting antennas should be ensured to be 0.5 wavelength minimally. But for some devices sensitive to sizes (e.g., a miniature terminal), application range of the conventional MIMO technology is limited. To solve problems of cost and size, a technician proposes a new MIMO technology based on an ESPAR (Electronically Steerable Parasitic Array Radiator) antenna, commonly referred to as Single RF MIMO (single radio frequency multiple-input and multiple-output) technology, which includes following features: 1, it consists of an active antenna and a plurality of parasitic antennas, and only one RF link is needed, so that cost is low and structure is simple; 2. one data stream is transmitted on the active antenna, and other data streams are transmitted by a coupled electromagnetic field of the parasitic antennas and the active antenna, thus a plurality of data streams may be transmitted simultaneously; 3. even if a distance between the antennas is smaller than ½ wavelength, it still ensures good independent fading characteristics of a channel, thus being suitable for small space devices. In general, the Single RF MIMO technology effectively avoids the two application shortcomings of the aforementioned MIMO technology.

The ESPAR antenna consists of M+1 units, wherein one unit is the active antenna and is connected with the RF link, and the remaining M units form a parasitic antenna array and are respectively connected with a controllable load. The existing Single RF MIMO technology will be briefly illustrated below with the ESPAR antenna with three units as an example.

As shown in FIG. 1, in the ESPAR antenna with three units, a cylindrical antenna filled with black at the middle is an active antenna and is connected with a RF link, rest two antennas are parasitic antennas and are connected with a parasitic reactor, wherein a value of the parasitic reactance is controlled by a control circuit. A distance between the active antenna and each parasitic antenna is assumed to be d, a data stream $s_1$ is loaded to the active antenna via the RF link for transmitting, while another path of data streams $s_2$ is used for adjusting the reactance values of the parasitic antennas via the control circuit combined with $s_1$, in order to adjust a mutual coupling electromagnetic field between the active antenna and each parasitic antenna, and the data stream $s_2$ is transmitted finally. A transmission directivity diagram $G(\theta)$ may be modeled as:

$$G(\theta) = g_{isol}(\theta) * AF$$
$$= g_{isol}(\theta) * a(\theta) * i$$
$$= g_{isol}(\theta) * [1 \quad e^{-jkd\cos(\theta-0)} \quad e^{-jkd\cos(\theta-\pi)}][I_0 \quad I_1 \quad I_2]^T$$
$$= g_{isol}(\theta) * [1 \quad e^{-jkd\cos(\theta)} \quad e^{jkd\cos(\theta)}][I_0 \quad I_1 \quad I_2]^T$$

In the above-mentioned formula, $g_{isol}(\theta)$ represents the transmission directivity diagram when only a single antenna exists;

AF represents an array factor of the antenna;

$k=2\pi/\lambda$, wherein parameter represents a wavelength;

d represents the interval between the active antenna and the parasitic antenna;

$\theta$ represents a departure angle of radiation;

$I_0$, $I_1$, $I_2$ sequentially represent current of three antennas. Expansion is made via an euler formula to obtain:

$$AF = I_0 + I_1 e^{-jkd\cos(\theta)} + I_2 e^{jkd\cos(\theta)}$$
$$= I_0 + (I_1 + I_2)\cos(kd\cos(\theta)) + j(I_2 - I_1)\sin(kd\cos(\theta))$$
$$= I_0 \left(B_0(\theta) + \frac{I_1+I_2}{I_0}B'_0(\theta) + j\frac{I_2-I_1}{I_0}B_1(\theta)\right)$$

In the above-mentioned formula, $B_0(\theta)=1$, $B'_0(\theta)=\cos(kd\cos(\theta))$, $B_1(\theta)=\sin(kd\cos(\theta))$;

when scatterers are sufficient enough, $B_0(\theta)\approx cB'_0(\theta)$, wherein $c\approx 0.9612$; $B_0(\theta)\perp B_1(\theta)$. Therefore, an array factor AF may be represented as a linear combination of two paths of orthorhombic basis functions $B_0(\theta)$ and $B_1(\theta)$, and the array factor AF may be further simplified as:

$$AF = I_0\left(\left(1+\frac{I_1+I_2}{I_0}c\right)B_0(\theta) + j\frac{I_2-I_1}{I_0}B_1(\theta)\right)$$
$$= s_1(B_0(\theta) + R_1 B_1(\theta))$$

wherein, $$s_1 = I_0\left(1 + \frac{I_1+I_2}{I_0}c\right)$$

represents the first path of transmitted data streams and is modulated by adjusting $I_0$; and the coefficient 1 is adjusted:

$$R_1 = j\frac{\frac{I_2}{I_0} - \frac{I_1}{I_0}}{1 + \left(\frac{I_1}{I_0} + \frac{I_2}{I_0}\right)c},$$

values of $\frac{I_2}{I_0}$ and $\frac{I_1}{I_0}$ are controlled by controlling $jX_1$ and $jX_2$ so that $$R_1 = r\frac{s_2}{s_1};$$

the parameter r is used for balancing the power of the basis functions, and when r=3.67, $P(B_0(\theta))=r^2P(B_1(\theta))$. Thus, $AF=s_1B_0(\theta)+rs_2B_1(\theta)$.

On the other hand, $$\frac{I_2}{I_0} \text{ and } \frac{I_1}{I_0}$$

may be calculated by the following method:

$$V_0=I_0Z_{00}+I_1Z_{01}+I_2Z_{02}$$

$$-jI_1X_1=I_0Z_{10}+I_1Z_{11}+I_2Z_{12}$$

$$-jI_1X_2=I_0Z_{20}+I_1Z_{21}+I_2Z_{22} \quad (1)$$

wherein, $Z_{ii}$, i=0, 1, 2 represents self-impedance of the three antennas; $Z_{ij}$, i≠j represents mutual impedance of the antenna i and the antenna j; the following formulas can be obtained from formula (1):

$$\frac{I_1}{I_0} = \frac{Z_{12}Z_{02} - Z_{01}(Z_{22} + jX_2)}{(Z_{11} + jX_1)(Z_{22} + jX_2) - Z_{12}^2} \quad (2)$$

$$\frac{I_2}{I_0} = \frac{Z_{12}Z_{02} - Z_{02}(Z_{11} + jX_1)}{(Z_{11} + jX_1)(Z_{22} + jX_2) - Z_{12}^2} \quad (3)$$

it can be seen from formula (2) and formula (3) that, $s_2/s_1$ is obtained according to input of $s_1$ and $s_2$, $jX_1$ and $jX_2$ are adjusted to change $$\frac{I_2}{I_0} \text{ and } \frac{I_1}{I_0},$$

to obtain $$R_1 = r\frac{s_2}{s_1},$$

and accordingly, two data streams are transmitted simultaneously. BPSK (Binary Phase Shift Keying) modulation Since $s_1$ and $s_2$ are selected in the set {−1,1}, the ratio, $s_2/s_1$ is selected in the set {−1,1}. It is assumed that, $jX_1$ and $jX_2$ respectively change from −100j to −0.4j, and minimum step size is −0.2j; when r=3.67, if amplitude deviation satisfies $$E_{Ampli} = \left|\frac{R_1 - r}{r}\right| \leq 0.04,$$

and angle deviation satisfies $$E_{Angle} = \left|\angle R_1 - \angle\frac{s_2}{s_1}\right| \leq 0.02,$$

exhaustive search is stopped to output a corresponding parasitic reactance combined value (note: the exhaustive search is performed only once, as it is irrespective to channel achievement), as shown in the following table 1:

TABLE 1

| Parasitic Reactance Combined Value of BPSK | | |
|---|---|---|
| $s_1/s_0$ | $X_1$ | $X_2$ |
| 1 | −3.8 | −8.0 |
| −1 | −8.0 | −3.8 |

QPSK (Quadrature Phase Shift Keying) modulation:

Since $s_1$ and $s_2$ are selected in the set (1+j,−1+j,−1−j,−1+j), the ratio, $s_2/s_1$, is selected in the set {1,−1,j,−j}. It is assumed that, $jX_1$ and $jX_2$ respectively change from −100j to −0.4j, and minimum step size is −0.2j; when r=3.67, if amplitude deviation satisfies $$E_{Ampli} = \left|\frac{R_1 - r}{r}\right| \leq 0.04,$$

and angle deviation satisfies $$E_{Angle} = \left|\angle R_1 - \angle\frac{s_2}{s_1}\right| \leq 0.02,$$

exhaustive search is stopped to output a corresponding parasitic reactance combined value, as shown in the following table 2:

TABLE 2

| Parasitic Reactance Combined Value of QPSK | | |
|---|---|---|
| $s_1/s_0$ | $X_1$ | $X_2$ |
| 1 | −3.8 | −8.0 |
| −1 | −8.0 | −3.8 |
| −j | −33.8 | −51.8 |
| j | −51.8 | −33.6 |

16QAM Modulation (quadrature amplitude modulation of 16 symbols):

Please see FIG. 2(a), FIG. 2(b) and FIG. 3, constellation points of $s_1$ or $s_2$ are selected in FIG. 2(a), and correspondingly, 52 constellation points of $s_2/s_1$ may be as shown in FIG. 2(b); it is assumed that, $jX_1$ and $jX_2$ respectively change from |100j to −0.4j, minimum step size is 0.2j; when r=3.67, if amplitude deviation satisfies $$E_{Ampli} = \left|\frac{R_1 - r}{r}\right| \leq 0.04,$$

and angle deviation satisfies $$E_{Angle} = \left|\angle R_1 - \angle \frac{s_2}{s_1}\right| \leq 0.02,$$

exhaustive search is stopped to obtain the constellation points of $R_1/3.67$ as shown in FIG. 3. It can be seen from the figure that, there are 8 points for which corresponding parasitic reactance combinations for satisfying the amplitude deviation and the angle deviation respectively can not be found. Even if r=2.5, at this time, power allocation of the basis functions is severely unequal, $P(B_0(\theta)) > r^2 P(B_1(\theta))$, and at this time, it may be still found from simulation that the corresponding parasitic reactance combinations of 4 constellation points could not be found. In FIG. 2(b), transverse and longitudinal distributions are: in-phase component (In-Phase), quadrature component (Quadrature). In FIG. 2(a), FIG. 2(b), FIG. 3, FIG. 5 and FIG. 6, triangles are constellation points of $R_1/3.67$, and asterisks are constellation points of $s_2/s_1$, which will not be illustrated repeatedly in the following embodiments. It can be seen from the above analysis that, in an open loop Single RF MIMO transmission process, when the same power is allocated for the basis functions, the system capacity is optimal. Therefore, in high order modulation (for example, 16QAM modulation) of Single RF MIMO, in order to find out the parasitic reactance combinations corresponding to 52 constellation points, the power allocated to the first basis function is much larger than the power of the second basis function, thereby greatly reducing the system capacity, and similar analysis also exists in 16PSK modulation. In the prior art, the high order modulation of Single RF MIMO could not be supported. Three solutions are proposed in the literature, but various problems are still present: 1. adjustable negative resistance is introduced, but this will break the stability of the system; 2. adjustable positive resistance is introduced, but this will dissipate a part of power of the system; 3. pre-coding is introduced, but this will worsen the computational burden of a transmitter or a receiver.

SUMMARY OF THE DISCLOSURE

Embodiments of the present disclosure provide a single radio frequency double-stream transmission apparatus, an use method and an antenna system, which are used for achieving high order modulation of Single RF MIMO via double-stream multiplexing.

In one aspect, an embodiment of the present disclosure provide a single radio frequency double-stream transmission apparatus, including:

a radio frequency link, a reactance control circuit, a parasitic reactor, an active antenna and an even number M of parasitic antennas, wherein M is larger than 2;

the radio frequency link is configured to generate a radio frequency signal;

the active antenna is connected with the radio frequency link, the parasitic antennas are respectively connected with the parasitic reactor, distances from the respective parasitic antennas to the active antenna are the same, and radian between adjacent parasitic antennas is $$\frac{360}{M} \text{ degrees};$$

and the parasitic reactor can be adjusted by the reactance control circuit to make reactance values of any pair of parasitic antennas in mirror symmetry via the active antenna be different and reactance values of rest pairs of parasitic antennas in mirror symmetry via the active antenna be equal respectively.

In the first possible implementation manner, a data stream $s_1$ is loaded onto the active antenna through the radio frequency circuit for transmitting;

the reactance control circuit adjusts the reactance values of the respective parasitic antennas according to input of two paths of data streams $s_2$ and $s_1$, for making the reactance values of the ith pair of parasitic antennas in mirror symmetry via the active antenna be different and the reactance values of the rest parasitic antennas be equal respectively, in order to make $$R_i = r_i \frac{s_2}{s_1}$$

workable, wherein $R_i$ represents an adjustment coefficient, the parameter $r_i$ is used for ensuring equal power of two paths basis functions $B_0(\theta)$ and $B_i(\theta)$, namely $P(B_0(\theta)) = r_i^2 P(B_i(\theta))$; wherein $P(B_0(\theta))$ represents power of the basis function $B_0(\theta)$; $P(B_i(\theta))$ represents power of the basis function $B_i(\theta)$; and $B_0(\theta)$ and $B_i(\theta)$ respectively represent two paths of orthogonal waveform primary functions unfolded for far fields of the antennas.

In combination with the first possible implementation manner of the first aspect, in the second possible implementation manner, the reactance control circuit is further configured to perform following polling operation on all parasitic antennas in mirror symmetry via the active antenna: setting $jX_i = L1$, $jX'_i = L2$, wherein $jX_i$ and $jX'_i$ respectively represent reactance values of an ith pair of parasitic antennas in mirror symmetry via the active antenna, and L1 and L2 represent reactance values which are set unequally; the reactance values corresponding to the rest parasitic antennas in mirror symmetry are respectively equal, so that $$R_i = r_i \frac{s_2}{s_1} = r_i,$$

for sending pilot information $p_i(n)$ of an ith directivity diagram i to a receiving end; and then, setting $jX_i = L2$, $jX'_i = L1$, and the reactance values corresponding to the rest parasitic antennas in mirror symmetry are respectively equal, so that $$R_i = r_i \frac{s_2}{s_1} = -r_i,$$

for sending pilot information $p_i(n)$ of the ith mirror image directivity diagram to the receiving end.

In combination with the second possible implementation manner of the first aspect, in the third possible implementation manner, a receiving apparatus is configured to receive a directivity diagram index i* of maximum channel capacity fed back by the receiving end, wherein the directivity diagram index i* is obtained in the following manner: estimating channel information of respective directivity diagrams i and mirror images thereof according to the $p_i(n)$ and $p'_i(n)$ received by the receiving end, and calculating channel information of two basis functions corresponding to the respective directivity diagrams i and the mirror images thereof to obtain channel capacity of the respective directivity diagrams i, so as to obtain the directivity diagram index of the optimal channel capacity; wherein $p_i(n)$ represents pilot information of the ith directivity diagram i, and $p'_i(n)$ represents pilot information of the ith mirror directivity diagram.

In combination with the third possible implementation manner of the first aspect, in the fourth possible implementation manner, the reactance control circuit is further configured to adjust $jX_{i*}$, $jX'_{i*}$ and $jX_i = jX'_i$ $\forall i \neq i*$ according to the directivity diagram index i* of the maximum channel capacity from the receiving end and the two paths of input data $s_1$ and $s_2$, to make $$R_{i*} = r_{i*} \frac{s_2}{s_1}$$

workable.

In the second aspect, an embodiment of the present disclosure provide an application method of a single radio frequency double-stream transmission apparatus, including:

obtaining a single radio frequency double-stream transmission apparatus, wherein the single radio frequency double-stream transmission apparatus includes: an active antenna connected with a radio frequency link, a radio frequency link, a reactance control circuit, a parasitic reactor, an active antenna and an even number M of parasitic antennas, wherein M is larger than 2; the active antenna is connected with the radio frequency link, the parasitic antennas are respectively connected with the parasitic reactor, distances from respective parasitic antennas to the active antenna are the same, and radian between adjacent parasitic antennas is $$\frac{360}{M} \text{ degrees;}$$

and adjusting the parasitic reactor through the reactance control circuit to make reactance values of any pair of parasitic antennas in mirror symmetry via the active antenna be different and reactance values of the rest pairs of parasitic antennas in mirror symmetry via the active antenna be equal respectively.

In combination with the implementation manner of the second aspect, in the first possible implementation manner, the method further includes:

loading a data stream $s_1$ onto the active antenna through the radio frequency circuit for transmitting; and adjusting the reactance values of the parasitic antennas via the reactance control circuit according to input of two paths of data streams $s_2$ and $s_1$, for making the reactance values of an ith pair of parasitic antennas in mirror symmetry via the active antenna be different and the reactance values of the rest parasitic antennas be equal respectively, in order to make $$R_i = r_i \frac{s_2}{s_1}$$

workable, wherein $R_i$ represents an adjustment coefficient, the parameter $r_i$ is used for ensuring equal power of two paths of basis functions $B_0(\theta)$ and $B_i(\theta)$, namely $P(B_0(\theta)) = r_i^2 P(B_i(\theta))$; wherein $P(B_0(\theta))$ represents power of a basis function $B_0(\theta)$; $P(B_i(\theta))$ represents power of a basis function $B_i(\theta)$; and $B_0(\theta)$ and $B_i(\theta)$ respectively represent two paths of orthogonal waveform primary functions unfolded for far fields of the antennas.

In combination with the first possible implementation manner of the second aspect, in the second possible implementation manner, the method further includes:

performing the following polling operation on all parasitic antennas in mirror symmetry via the active antenna by using the reactance control circuit: setting $jX_i = L1$, $jX'_i = L2$, wherein $jX_i$ and $jX'_i$ respectively represent reactance values of the ith pair of parasitic antennas in mirror symmetry of a transmitting end, and L1 and L2 represent reactance values which are set unequally; the reactance values corresponding to the rest parasitic antennas in mirror symmetry are respectively equal, so that $$R_i = r_i \frac{s_2}{s_1} = r_i,$$

for sending pilot information $p_i(n)$ of the ith directivity diagram i to a receiving end; and then, setting $jX_i = L2$, $jX'_i = L1$, and the reactance values corresponding to the rest parasitic antennas in mirror symmetry are respectively equal, so that $$R_i = r_i \frac{s_2}{s_1} = -r_i,$$

for sending pilot information $p'_i(n)$ of the ith mirror directivity diagram to the receiving end.

In combination with the second possible implementation manner of the second aspect, in the third possible implementation manner, a directivity diagram index i* of maximum channel capacity fed back by the receiving end is received via a receiving apparatus, wherein the directivity diagram index i* is obtained in the following manner: estimating channel information of respective directivity diagrams i and mirror images thereof according to the $p_i(n)$ and $p'_i(n)$ received by the receiving end, and calculating channel information of two basis functions corresponding to the respective directivity diagrams i and the mirror images thereof to obtain channel capacity of the respective directivity diagrams i, so as to obtain an directivity diagram index i* of optimal channel capacity; wherein the $p_i(n)$ represents pilot information of the ith directivity diagram i, and the $p'_i(n)$ represents pilot information of the ith mirror directivity diagram.

In combination with the third possible implementation manner of the second aspect, in the fourth possible implementation manner, $jX_{i*}$, $jX'_{i*}$ and $jX_i = jX'_i$ $\forall i \neq i*$ are adjusted via the reactance control circuit according to the directivity diagram index i* of the maximum channel capacity from the receiving end and the two paths of input data $s_1$ and $s_2$, so that $$R_{i^*} = r_{i^*} \frac{s_2}{s_1}.$$

In the third aspect, an embodiment of the present disclosure provide an antenna system of a single radio frequency double-stream transmission apparatus, including: a receiving end and a transmitting end, wherein the transmitting end is any single radio frequency double-stream transmission apparatus provided by the embodiments of the present disclosure; and the receiving end at least includes two active antennas, and the active antennas are connected with the radio frequency link.

In combination with the implementation manner of the third aspect, in the first possible implementation manner, if the transmitting end is the single radio frequency double-stream transmission apparatus of claim 5, the receiving end is configured to estimate the channel information of the respective directivity diagrams i and the mirror images thereof according to the $p_i(n)$ and $p'_i(n)$ received from the transmitting end, and calculate the channel information of basis primary functions corresponding to the respective directivity diagrams i and the mirror images thereof to obtain the channel capacity of the respective directivity diagrams i, so as to obtain the directivity diagram index i* of the optimal channel capacity; wherein the $p_i(n)$ represents the pilot information of the ith directivity diagram i, and the $p'_i(n)$ represents the pilot information of the ith mirror directivity diagram.

It can be seen from the technical solutions mentioned above that, the embodiments of the present disclosure have the following advantages: an additional degree of freedom of adjustable parasitic reactance is introduced to achieve double-stream multiplexing, so as to achieve high order modulation of Single RF MIMO. In the solutions, no negative resistance or positive resistance needs to be introduced, no pre-coding needs to be introduced neither, thereby ensuring system stability, saving system power and alleviating computational burden while achieving high order modulation.

BRIEF DESCRIPTION OF THE DRAWINGS

To illustrate technical solutions in the embodiments of the present disclosure more clearly, a brief introduction on the accompanying drawings which are needed in the description of the embodiments is given below. Apparently, the accompanying drawings in the description below are merely some of the embodiments of the present disclosure, based on which other drawings may be obtained by those of ordinary skill in the art without any creative effort.

DETAILED DESCRIPTION OF THE EMBODIMENTS

In order that the purposes, technical solutions and advantages of the present disclosure are clearer, a further detailed description of the present disclosure will be given below in combination with accompanying drawings. Apparently, the embodiments described below are merely a part, but not all, of the embodiments of the present disclosure. All of the other embodiments, obtained by those of ordinary skill in the art based on the embodiments of the present disclosure without any creative effort, fall into the protection scope of the present disclosure.

Figure 1:
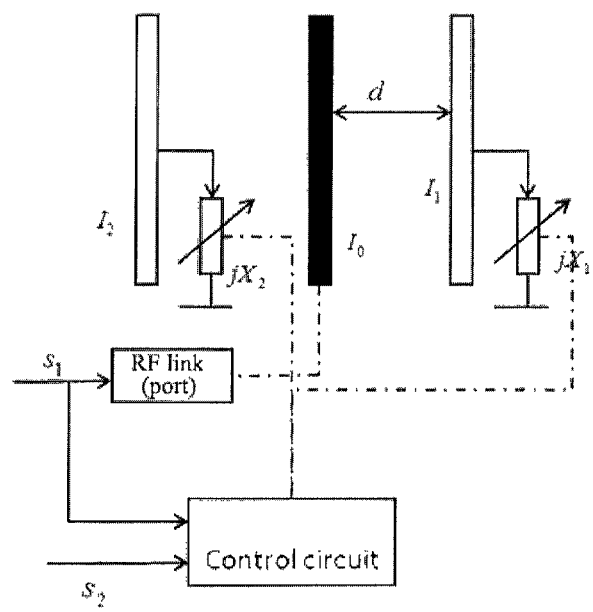
FIG. 1 is a schematic diagram of a structure of an ESPAR antenna with three units.
Figure 2A:
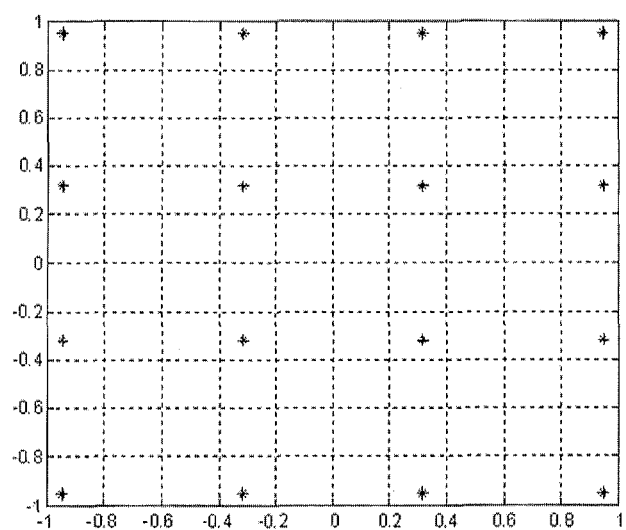
FIG. 2(a) is a schematic diagram of a constellation of $s_1$ or $s_2$ during 16QAM modulation.
Figure 2B:
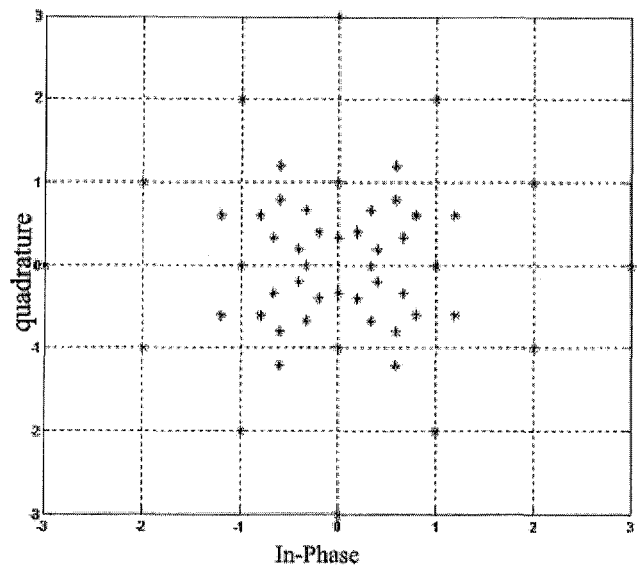
FIG. 2(b) is a schematic diagram of 52 constellation points of $s_2/s_1$ during 16QAM modulation.
Figure 3:
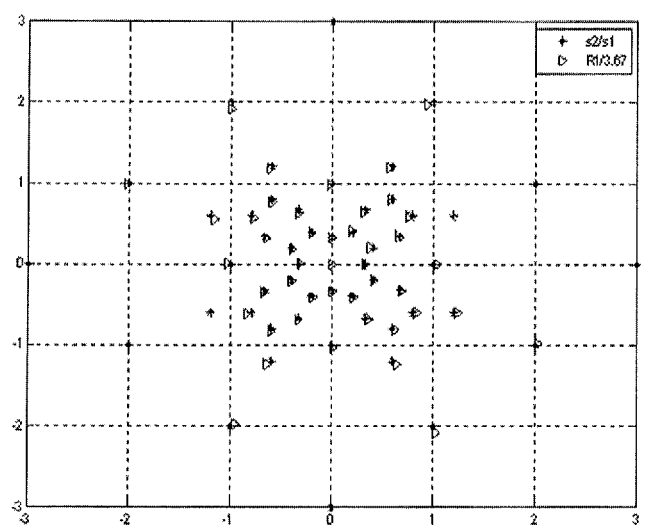
FIG. 3 is a schematic diagram of constellation points of $R_1/3.67$.
Figure 4:
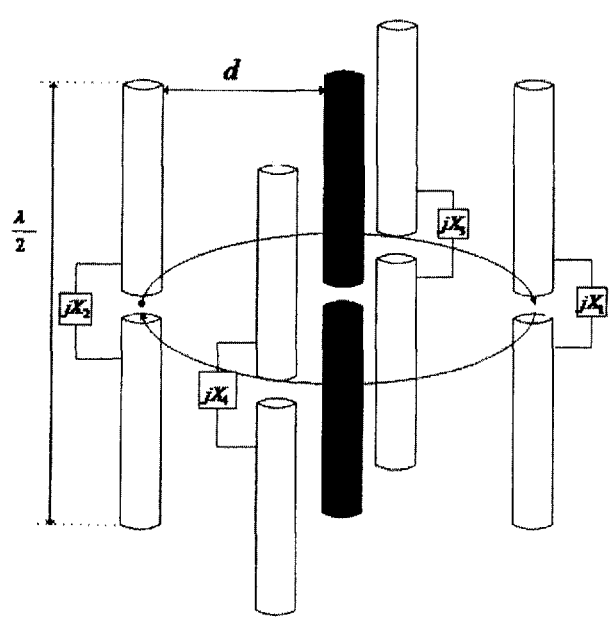
FIG. 4 is a schematic diagram of a structure of an ESPAR dipole array with 5 units in an embodiment of the present disclosure.

An embodiment of the present disclosure provides a single radio frequency double-stream transmission apparatus, as shown in FIG. 4, including:

a radio frequency link, a reactance control circuit, a parasitic reactor, one active antenna (in FIG. 4, a cylindrical dipole antenna filled with black) and an even number M of parasitic antennas (in FIG. 4, cylindrical dipole antennas surrounding the active antenna and filled with white), wherein M is larger than 2, and the radio frequency link may generate a radio frequency signal; it should be noted that, physical form of each antenna as shown in FIG. 4 is merely schematic, and should not be understood as limitation to the embodiment of the present disclosure, and the physical form of each antenna may be a monopole antenna, a patch antenna and the like; as shown in FIG. 4, M is 4, actually, M can be an even number larger than 2, and the example of the number of M in FIG. 4 should not be understood as limitation to the embodiment of the present disclosure. Detailed illustration will be given in the following embodiments on the principle of the solutions in the embodiments of the present disclosure and why corresponding technical effects may be achieved by taking FIG. 4 as an example.

The active antenna is connected with the radio frequency link, the parasitic antennas are respectively connected with the parasitic reactor, distances from the respective parasitic antennas to the active antenna are the same, and radian between adjacent parasitic antennas is $$\frac{360}{M} \text{ degrees};$$

and the parasitic reactor can be adjusted by the reactance control circuit to make reactance values of any pair of parasitic antennas in mirror symmetry via the active antenna be different and reactance values of the rest pairs of parasitic antennas in mirror symmetry via the active antenna be equal respectively.

In the above-mentioned embodiment, an additional degree of freedom of adjustable parasitic reactance is introduced to achieve double-stream multiplexing, so as to achieve high order modulation of Single RF MIMO. In the solution, no negative resistance or positive resistance needs to be introduced, and no pre-coding needs to be introduced neither, thereby ensuring the system stability, saving the system power and alleviating the computational burden while achieving high order modulation. More detailed illustration on the demonstration of the above-mentioned effects will be given in the examples of the subsequent embodiments.

More specifically, in the above-mentioned apparatus, a data stream $s_1$ is loaded onto the active antenna for transmitting through the radio frequency circuit generating the radio frequency signal; and the reactance control circuit adjusts reactance values of the parasitic antennas according to input of data streams $s_2$ and $s_1$, for making the reactance values of the ith pair of parasitic antennas in mirror symmetry via the active antenna be different and the reactance values of the rest parasitic antennas be equal respectively, in order to make $$R_i = r_i \frac{s_2}{s_1}$$

workable, wherein $R_i$ represents an adjustment coefficient, the parameter $r_i$ is used for ensuring equal power of two paths of primary functions $B_0(\theta)$ and $B_i(\theta)$, namely $P(B_0(\theta)) = r_i^2 P(B_i(\theta))$; $P(B_0(\theta))$ represents the power of the basis function $B_0(\theta)$; $P(B_i(\theta))$ represents the power of the basis function $B_i(\theta)$; and $B_0(\theta)$ and $B_i(\theta)$ respectively represent two paths of orthogonal waveform basis functions unfolded for far fields of the antennas. An embodiment of the present disclosure further provides an implementation manner of the above-mentioned antennas for obtaining directivity diagram diversity gains, which is specifically as follows:

the reactance control circuit is further configured to perform the following polling operation on all parasitic antennas in mirror symmetry via the active antenna: setting $jX_i = L1$, $jX'_i = L2$, wherein $jX_i$ and $jX'_i$ respectively represent the reactance of the ith pair of parasitic antennas in mirror symmetry via the active antenna, and L1 and L2 represent the reactance values which are set unequally; the reactance values corresponding to the rest parasitic antennas in mirror symmetry are respectively equal, so that $$R_i = r_i \frac{s_2}{s_1} = r_i$$

is workable, for sending pilot information $p_i(n)$ of the ith directivity diagram to a receiving end; and then, setting $jX_i = L2$, $jX'_i = L1$, and the reactance values corresponding to the rest parasitic antennas in mirror symmetry are respectively equal, so that $$R_i = r_i \frac{s_2}{s_1} = -r_i,$$

for sending pilot information $p'_i(n)$ of the ith mirror directivity diagram to the receiving end. Further, the above-mentioned apparatus further includes: a receiving apparatus, configured to receive a directivity diagram index i* of maximum channel capacity fed back by the receiving end, wherein the directivity diagram index i* is obtained in the following manner: estimating channel information of respective directivity diagrams i and mirror images thereof according to the $p_i(n)$ and $p'_i(n)$ received by the receiving end, and calculating channel information of two basis functions corresponding to the respective directivity diagrams i and the mirror images thereof to obtain channel capacity of the respective directivity diagrams i, so as to obtain the directivity diagram index i* of the optimal channel capacity; wherein $p_i(n)$ represents pilot information of the ith directivity diagram i, and $p'_i(n)$ represents pilot information of the ith mirror directivity diagram. Further, the solution of obtaining the diversity gains at the transmitting end may be specifically as follows:

the above-mentioned reactance control circuit is further configured to adjust $jX_{i*}$, $jX'_{i*}$ and $jX_i = jX'_i$, $\forall i \neq i^*$ according to the directivity diagram index i* of the maximum channel capacity from the receiving end and the two paths of input data $s_1$ and $s_2$, to make $$R_{i*} = r_{i*} \frac{s_2}{s_1}$$

workable. The meaning of the mathematical expression in the adjustment of $jX_{i*}$, $jX'_{i*}$ and $jX_i = jX'_i$, $\forall i \neq i^*$ is as follows: adjusting the parasitic reactance $jX_{i*}$ and $jX'_{i*}$ of a pair of parasitic antennas corresponding to i* to make the reactance values of the above-mentioned pair of parasitic antennas be unequal; adjusting the reactance of other parasitic antennas excluding the pair of parasitic antennas corresponding to i*, to make the reactance values of the parasitic antennas in mirror symmetry via the active antenna in the above-mentioned other parasitic antennas be respectively equal. Detailed illustration will be given in the following embodiments on the principle of the solutions in the embodiments of the present disclosure and why corresponding technical effects may be achieved by taking FIG. 4 as an example.

As shown in FIG. 4, it is an ESPAR dipole array with 5 units, including one active antenna and 4 parasitic antennas, wherein the parasitic antennas are respectively connected with corresponding parasitic reactors $jX_1$-$jX_4$, distance between each parasitic antenna and the active antenna is d, and adjacent radian of the adjacent parasitic antennas is 90 degrees. The ESPAR antenna with 5 units may simultaneously transmit three data streams, but will suffer the same problem as the ESPAR antenna with 3 units in the prior art, namely that it could not balance the power of the basis functions. However, if being used for transmitting two data streams, the ESPAR antenna with 5 units may not only balance the power of the basis functions, but also reduce adjustable range of the reactance, thereby reducing complexity of the reactance control circuit. Specific analysis is as follows:

a transmission master drawing $G(\theta)$ of the ESPAR antennas with 5 units may be expressed as:

$$\begin{aligned} G(\theta) &= g_{isol}(\theta) * AF \\ &= g_{isol}(\theta) * a(\theta) * i \\ &= g_{isol}(\theta) * \begin{bmatrix} 1 & e^{-jkd\cos(\theta-0)} & e^{-jkd\cos(\theta-\pi)} & e^{-jkd\cos(\theta-\frac{\pi}{2})} & e^{-jkd\cos(\theta+\frac{\pi}{2})} \end{bmatrix} \\ &\quad \begin{bmatrix} I_0 & I_1 & I_2 & I_3 & I_4 \end{bmatrix}^T \\ &= g_{isol}(\theta) * \begin{bmatrix} 1 & e^{-jkd\cos(\theta)} & e^{jkd\cos(\theta)} & e^{-jkd\sin(\theta)} & e^{-jkd\sin(\theta)} \end{bmatrix} \\ &\quad \begin{bmatrix} I_0 & I_1 & I_2 & I_3 & I_4 \end{bmatrix}^T \end{aligned}$$

wherein, $g_{isol}(\theta)$ represents a transmission directivity diagram when only a single antenna exists;

AF represents an array factor of the antenna;

k=2π/λ, wherein parameter λ represents a wavelength;

d represents an interval between the active antenna and the parasitic antenna;

θ represents a departure angle of radiation; and $I_0$ represents current of the active antenna, and $I_1$, $I_2$, $I_3$, $I_4$ represent current of the parasitic antennas respectively.

The array factor is further expanded via an euler formula to obtain the following formulas:

$$AF = I_0 + (I_1 + I_2)\cos(kd\cos(\theta)) + (I_3 + I_4)\cos(kd\sin(\theta)) +$$
$$j(I_2 - I_1)\sin(kd\cos(\theta)) + (I_4 - I_3)\sin(kd\sin(\theta))$$
$$= I_0\Big(B_0(\theta) + \frac{I_1 + I_2}{I_0}B'_0(\theta) + \frac{I_3 + I_4}{I_0}B''_0(\theta) +$$
$$j\frac{I_2 - I_1}{I_0}B_1(\theta) + j\frac{I_4 - I_3}{I_0}B_2(\theta)\Big)$$

wherein, $B_0(\theta)=1$; $B'_0(\theta)=\cos(kd\cos(\theta))$; $B_0''(\theta)=\cos(kd\sin(\theta))$; $B_1(\theta)=\sin(kd\cos(\theta))$; and $B_2((\theta)=\sin(kd\sin(\theta))$.

When scatterers are sufficient enough, it may be obtained that:

$B_0(\theta) \approx cB'_0(\theta)$, wherein $c \approx 0.9612$; $B_0(\theta) \perp B_1(\theta) \perp B_2(\theta)$. Therefore, the array factor may be expressed as follows:

$$AF = I_0\Big(\Big(1 + \frac{I_1 + I_2 + I_3 + I_4}{I_0}c\Big)B_0(\theta) + j\frac{I_2 - I_1}{I_0}B_1(\theta) + j\frac{I_4 - I_3}{I_0}B_2(\theta)\Big) \quad (4)$$
$$= s_1(B_0(\theta) + R_1B_1(\theta) + R_2B_1(\theta))$$

wherein, $$s_1 = I_0\Big(1 + \frac{I_1 + I_2 + I_3 + I_4}{I_0}c\Big)$$

is used for transmitting the first path of data; the coefficient 1 is adjusted:

$$R_1 = j\frac{\frac{I_2}{I_0} - \frac{I_1}{I_0}}{1 + \Big(\frac{I_1}{I_0} + \frac{I_2}{I_0} + \frac{I_3}{I_0} + \frac{I_4}{I_0}\Big)c} = r_1\frac{s_2}{s_1},$$

for transmitting the second path of data; and the coefficient 2 is adjusted:

$$R_2 = j\frac{\frac{I_4}{I_0} - \frac{I_3}{I_0}}{1 + \Big(\frac{I_1}{I_0} + \frac{I_2}{I_0} + \frac{I_3}{I_0} + \frac{I_4}{I_0}\Big)c} = r_2\frac{s_3}{s_1},$$

for transmitting the third path of data. The parameters $r_1$ and $r_2$ are used for balancing the power of the first path of basis function, the second path of basis function and the third path of basis function. How to solve $$\frac{I_i}{I_0} i = 1, 2, 3, 4$$

is analyzed below:

$$V_0 = I_0Z_{00} + I_1Z_{01} + I_2Z_{02} + I_3Z_{03} + I_4Z_{04}$$

$$-jI_1X_1 = I_0Z_{10} + I_1Z_{11} + I_2Z_{12} + I_3Z_{13} + I_4Z_{14}$$

$$-jI_2X_2 = I_0Z_{20} + I_1Z_{21} + I_2Z_{22} + I_3Z_{23} + I_4Z_{24}$$

$$-jI_3X_3 = I_0Z_{30} + I_1Z_{31} + I_2Z_{32} + I_3Z_{33} + I_4Z_{34}$$

$$-jI_4X_4 = I_0Z_{40} + I_1Z_{41} + I_2Z_{42} + I_3Z_{43} + I_4Z_{44}$$

wherein, $Z_{ii}$, i=0, 1, 2, 3, 4 represents self-impedance of the antennas; $Z_{ij}$, i≠j represents mutual impedance of the antenna i and the antenna j; thus the following formula can be obtained:

$$\begin{bmatrix} I_1/I_0 \\ I_2/I_0 \\ I_3/I_0 \\ I_4/I_0 \end{bmatrix} = \begin{bmatrix} Z_{11}+jX_1 & Z_{12} & Z_{13} & Z_{14} \\ Z_{21} & Z_{22}+jX_2 & Z_{23} & Z_{24} \\ Z_{31} & Z_{32} & Z_{33}+jX_3 & Z_{34} \\ Z_{41} & Z_{42} & Z_{43} & Z_{44}+jX_4 \end{bmatrix}^{-1} \begin{bmatrix} -Z_{10} \\ -Z_{20} \\ -Z_{30} \\ -Z_{40} \end{bmatrix} \quad (5)$$

As appointed above, if the ESPAR antenna with 5 units is used for transmitting three data streams, the balance of power could not be guaranteed. However, if being used for transmitting two data streams, the ESPAR antenna with 5 units may not only provide an additional degree of freedom of design to achieve high order modulation under the condition of ensuring the balance of the power, but also reduce the complexity of the reactance control circuit. It can be obtained according to the formula (5) that, when $jX_3=jX_4$ is ensured, $I_3/I_4=I_4/I_0$ may be obtained, and the following formula may be obtained by substituting the formula in formula (4):

$$AF = s_1(B_0(\theta) + R_1B_1(\theta))$$
$$= s_1(B_0(\theta) + r_1s_2B_1(\theta))$$

According to the above-mentioned formula, the ESPAR antenna with 5 units may be used for simultaneously transmitting two data streams. When $r_1=3.67$, the power allocation of two paths of basis functions is the same, namely, $P(B_0(\theta))=r_m^2 P(B_1(\theta))$. To sum up, in the method, $jX_3=jX_4$ is ensured to omit the third data stream, and $I_1/I_0$, $I_2/I_0$, $I_3/I_0=I_4/I_0$ are adjusted by adjusting $jX_1$, $jX_2$ and $jX_3=jX_4$, to obtain $$R_1 = r_1\frac{s_2}{s_1}$$

and $R_2=0$. $jX_1=jX_2$ may be obtained by the same analysis, to omit the second data stream, and $I_3/I_0$, $I_4/I_0$, $I_1/I_0=I_2/I_0$ are adjusted by adjusting $jX_3$, $jX_4$ and $jX_1=jX_2$, to obtain $R_1=0$ and $$R_2 = r_2\frac{s_3}{s_1}.$$

Figure 5:
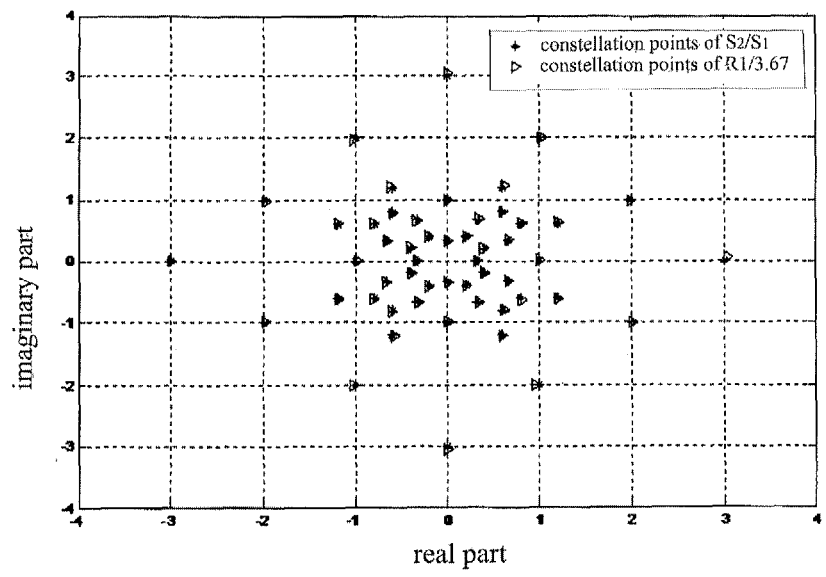
FIG. 5 is a schematic diagram of constellation points of $R_1/3.67$ during 16QAM modulation in an embodiment of the present disclosure.
Figure 6:
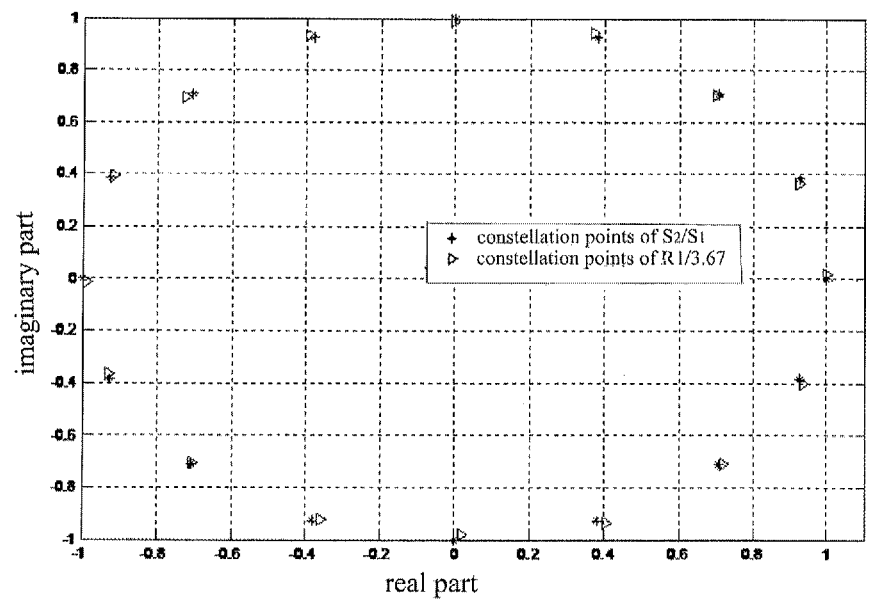
FIG. 6 is a schematic diagram of constellation points of $R_1/3.67$ during 16PSK modulation in an embodiment of the present disclosure.

Illustration will be given below on achievement of several types of modulation:

1. 16QAM Modulation:

It is assumed that $jX_1$, $jX_2$, $jX_3 = jX_4$ respectively change from $-100j$ to $-1j$, and minimum step size is $-1j$; when $r=3.67$, if amplitude deviation satisfies $$E_{Ampli} = \left|\frac{R_1 - r}{r}\right| \leq 0.02,$$

and angle deviation satisfies $$E_{Angle} = \left|\angle R_1 - \angle \frac{s_2}{s_1}\right| \leq 0.02,$$

exhaustive search is stopped to obtain constellation points of $R_1/3.67$ as shown in FIG. 5, and it can be seen from FIG. 5 that these constellation points are basically matched with $s_2/s_1$. 2. 16PSK modulation:

In 16PSK modulation, the changed parameter is merely phase of the signal, thus constellation points of $s_1$ or $s_2$ are actually constellation points of $s_2/s_1$. It is assumed that $jX_1$, $jX_2$, $jX_3 = jX_4$ respectively change from $-100j$ to $-1j$, and minimum step size is $-1j$; when $r=3.67$, if amplitude deviation satisfies $$E_{Ampli} = \left|\frac{R_1 - r}{r}\right| \leq 0.02,$$

and angle deviation satisfies $$E_{Angle} = \left|\angle R_1 - \angle \frac{s_2}{s_1}\right| \leq 0.02,$$

exhaustive search is stopped to obtain constellation points of $R_1/3.67$ as shown in FIG. 6, and it can be seen from FIG. 6 that these constellation points are basically matched with $s_2/s_1$.

It is set that $jX_1$, $jX_2$ and $jX_3 = jX_4$ respectively change from $-50j$ to $-0.5j$, and minimum step size is $-0.5j$; the amplitude deviation condition and the phase deviation condition may be still satisfied, thus compared with the conventional ESPAR array with 3 units, the adjustable range of each reactance value may be half sized. To sum up, the solution in the embodiment of the present disclosure may be used for effectively reducing the complexity of circuit design.

It can be seen from the analysis of the foregoing ESPAR dipole array with 5 units that, the two paths of data streams may be both transmitted by adjusting $jX_1$, $jX_2$ and $jX_3 = jX_4$ and by adjusting $jX_3$, $jX_4$ and $jX_1 = jX_2$. The directivity diagram of a transmitting antenna and the mirror image thereof will be changed if it is ensured that the reactance values of which pair of parasitic antennas in mirror symmetry via the active antenna are unequal and the reactance values of the rest parasitic antennas in mirror symmetry via the active antenna are respectively equal. If $jX_1$ $jX_2$ and $jX_3 = jX_4$ are adjusted, we may obtain the directivity diagram 1 and the mirror image thereof; correspondingly, if the $jX_3$, $jX_4$ and $jX_1 = jX_2$ are adjusted, we may obtain the directivity diagram 2 and the mirror image thereof. The present disclosure further provides an embodiment of how to select a directivity diagram for transmission to obtain a directivity diagram diversity gain. The details are as follows:

1. Channel Estimation Stage

For the ESPAR dipole array with 5 units, a pilot sequence is divided into four blocks: the first and second blocks are used in channel estimation of a directivity diagram 1; the third and fourth blocks are used in channel estimation of a directivity diagram 2, therefore:

the first block: the transmitting end adjusts $jX_1 = L1$, $jX_2 = L2$ and $jX_3 = jX_4 = L3$ for transmitting BPSK data to obtain $R_1 = r_1 s_2/s_1 = r_1$, and the first antenna of the receiving end estimates to obtain a channel value $h_{\xi_1,1}^1$ of the directivity diagram 1;

the second block: the transmitting end adjusts $jX_1 = L2$, $jX_2 = L1$ and $jX_3 = jX_4 = L3$ for transmitting the BPSK data to obtain $R_1 = r_1 s_2/s_1 = -r_1$, and the first antenna of the receiving end estimates to obtain a channel value $h_{\xi_1,2}^1$ of the directivity diagram 1;

the third block: the transmitting end adjusts $jX_3 = L1$, $jX_4 = L2$ and $jX_1 = jX_2 = L3$ for transmitting the BPSK data to obtain $R_2 = r_2 s_2/s_1 = r_2$, and the first antenna of the receiving end estimates to obtain a channel value $h_2$ of the directivity diagram 2;

the fourth block: the transmitting end adjusts $jX_3 = L2$, $jX_4 = L1$ and $jX_1 = jX_2 = L3$ for transmitting the BPSK data to obtain $R_2 = r_2 s_2/s_1 = r_2$, and the first antenna of the receiving end estimates to obtain a channel value $h_{\xi_2,2}^1$ of the directivity diagram 2; and it is assumed that two receiving antennas are installed on the receiving end, thus for the second receiving antenna, $h_{\xi_1,1}^2$, $h_{\xi_1,2}^2$, $h_{\xi_2,1}^2$ and $h_{\xi_2,2}^2$ may be obtained by estimation.

2. Basis Function Channel Response Calculation

It is set that channel response of two basis functions $B_0(\theta)$ and $B_1(\theta)$ is respectively $h_{\Sigma_1,1}$ and $h_{\Delta_1,1}$ when the first receiving antenna receives the directivity diagram 1 and the mirror image thereof, and is figured out by the following formulas:

$$h_{\Sigma_1,1} = \frac{1}{\sqrt{2}}\left(h_{\xi_1,1}^1 + h_{\xi_1,2}^1\right)$$

$$h_{\Delta_1,1} = \frac{1}{\sqrt{2}}\left(h_{\xi_1,1}^1 - h_{\xi_1,2}^1\right)$$

It is set that channel response of two basis functions $B_0(\theta)$ and $B_1(\theta)$ is respectively $h_{\Sigma_1,2}$ and $h_{\Delta_1,2}$ when the second receiving antenna receives the directivity diagram 1 and the mirror image thereof, and is figured out by the following formulas:

$$h_{\Sigma_1,2} = \frac{1}{\sqrt{2}}\left(h_{\xi_1,1}^2 + h_{\xi_1,2}^2\right)$$

$$h_{\Delta_1,2} = \frac{1}{\sqrt{2}}\left(h_{\xi_1,1}^2 - h_{\xi_1,2}^2\right)$$

It is set that channel response of two basis functions $B_0(\theta)$ and $B_1(\theta)$ is respectively $h_{\Sigma_2,1}$ and $h_{\Delta_2,1}$ when the first receiving antenna receives the directivity diagram 2 and the mirror image thereof, and is figured out by the following formulas:

$$h_{\Sigma_2,1} = \frac{1}{\sqrt{2}}\left(h_{\xi_2,1}^1 + h_{\xi_2,2}^1\right)$$

$$h_{\Delta_2,1} = \frac{1}{\sqrt{2}}\left(h^1_{\xi_2,1} - h^1_{\xi_2,2}\right)$$

It is set that channel response of two basis functions $B_0(\theta)$ and $B_1(\theta)$ is respectively $h_{\Sigma_2,2}$ and $h_{\Delta_2,2}$ when the second receiving antenna receives the directivity diagram 2 and the mirror image thereof, and is figured out by the following formulas:

$$h_{\Sigma_2,2} = \frac{1}{\sqrt{2}}\left(h^2_{\xi_2,1} + h^2_{\xi_2,2}\right)$$

$$h_{\Delta_2,2} = \frac{1}{\sqrt{2}}\left(h^2_{\xi_2,1} - h^2_{\xi_2,2}\right)$$

3. Channel Capacity Calculation

According to the directivity diagram 1 and the mirror image thereof, the receiving end obtains a 2×2 MIMO array:

$$H_1 = \begin{bmatrix} h_{\Sigma_1,1} & h_{\Delta_1,1} \\ h_{\Sigma_1,2} & h_{\Delta_1,2} \end{bmatrix};$$

and according to the directivity diagram 2 and the mirror image thereof, the receiving end obtains a 2×2 MIMO array:

$$H_2 = \begin{bmatrix} h_{\Sigma_2,1} & h_{\Delta_2,1} \\ h_{\Sigma_2,2} & h_{\Delta_2,2} \end{bmatrix};$$

The channel capacity of the respective directivity diagrams and the mirror images thereof may be obtained according to a Shannon equation, namely:

$$C_i = \log_2 \det\left(I_{2\times 2} + \frac{P_{total}}{2\times \sigma^2} H_i H_i^H\right);$$

$$i = 1, 2, \ldots$$

wherein, $P_{total}$ represents total emission power, and $\sigma^2$ represents noise power.

The above-mentioned solutions may be summarized as follows:

the transmitting end sets $jX_i=L1$, $jX'_i=L2$, wherein $jX_i$ and $jX'_i$ respectively represent the reactance of the ith pair of parasitic antennas in mirror symmetry of the transmitting end, and L1 and L2 represent the reactance values which are set unequally; the reactance values corresponding to the rest parasitic antennas in mirror symmetry are respectively equal, the pilot information $p_i(n)$ of the ith directivity diagram i is sent to the receiving end, to obtain $$R_i = r_i \frac{s_2}{s_1} = r_i;$$

and then $jX_i=L2$, $jX'_i=L1$ is set, the reactance values corresponding to the rest parasitic antennas in mirror symmetry are respectively equal, and the pilot information $p'_i(n)$ of the ith mirror directivity diagram is sent to the receiving end to make $$R_i = r_i \frac{s_2}{s_1} = -r_i$$

workable; and polling is performed on all the parasitic antenna pairs with the active antenna as the center.

And then, the receiving end estimates the channel information of the respective directivity diagrams i and the mirror images thereof according to the received $p_i(n)$ and $p'_i(n)$, and calculates the channel information of two basis functions corresponding to the respective directivity diagrams i and the mirror images thereof to obtain the channel capacity of the respective directivity diagram i; wherein the $p_i(n)$ represents the pilot information of the ith directivity diagram i, and the $p'_i(n)$ represents the pilot information of the ith mirror directivity diagram; and the directivity diagram index i* of the optimal channel capacity is fed back to the transmitting end.

Finally, the transmitting end adjusts $jX_{i*}$, $jX'_{i*}$ and $jX_i=jX'_i$ $\forall i \neq i*$ according to the directivity diagram index i* of the optimal channel capacity and the two paths of input data $s_1$ and $s_2$, to obtain $$R_{i*} = r_{i*} \frac{s_2}{s_1}.$$

Figure 7:
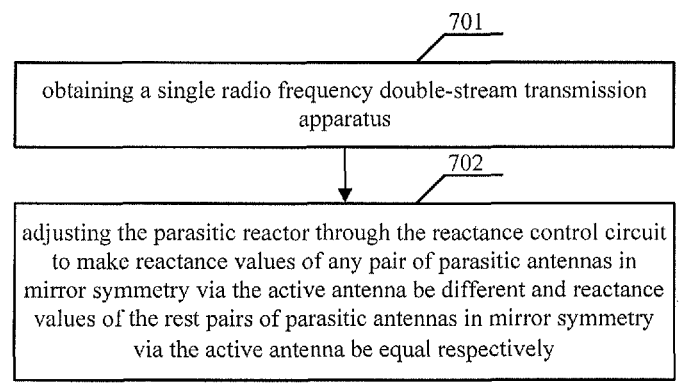
FIG. 7 is a flowchart of a method in an embodiment of the present disclosure.

Correspondingly, an embodiment of the present disclosure further provides a use method of a single radio frequency double-stream transmission apparatus, as shown in FIG. 7, including:

701: obtaining a single radio frequency double-stream transmission apparatus, as shown in FIG. 4 and the apparatus embodiments; the single radio frequency double-stream transmission apparatus includes: an active antenna connected with a radio frequency link, the radio frequency link, a reactance control circuit, a parasitic reactor, an active antenna and an even number M of parasitic antennas, wherein M is larger than 2; the active antenna is connected with the radio frequency link, the parasitic antennas are respectively connected with the parasitic reactor, distances from the respective parasitic antennas to the active antenna are the same, and radian between adjacent parasitic antennas is $$\frac{360}{M} \text{ degrees;}$$

702: adjusting the parasitic reactor through the reactance control circuit to make reactance values of any pair of parasitic antennas in mirror symmetry via the active antenna be different and reactance values of the rest pairs of parasitic antennas in mirror symmetry via the active antenna be equal respectively. In the embodiments mentioned above, an additional degree of freedom of parasitic reactance is introduced to achieve double-stream multiplexing, so as to achieve high order modulation of Single RF MIMO. In the solutions, no negative resistance or positive resistance needs to be introduced, and no pre-coding needs to be introduced neither, thereby ensuring the system stability, saving the system power and alleviating the computational burden while achieving high order modulation. Further, if the parasitic antennas with unequal reactance values are the ith pair of parasitic antennas, the method further includes:

loading a data stream $s_1$ onto the active antenna through the radio frequency circuit for transmitting; and adjusting the reactance values of the parasitic antennas via the reactance control circuit according to input of two paths of data streams $s_2$ and for making the reactance values of the ith pair of parasitic antennas in mirror symmetry via the active antenna be different and the reactance values of the rest parasitic antennas be equal respectively, in order to make $$R_i = r_i \frac{s_2}{s_1}$$

workable, wherein $R_i$ represents an adjustment coefficient, the parameter $r_i$ is used for ensuring equal power of two paths of basis functions $B_0(\theta)$ and $B_i(\theta)$, namely $P(B_0(\theta)) = r_i^2 P(B_i(\theta))$; $P(B_0(\theta))$ represents the power of the basis function $B_0(\theta)$; $P(B_i(\theta))$ represents the power of the basis function $B_i(\theta)$; $B_0(\theta)$ and $B_i(\theta)$ respectively represent two paths of orthogonal waveform basis functions unfolded for far fields of the antennas. An embodiment of the present disclosure further provides an implementation manner of obtaining directivity diagram diversity gains by using the above-mentioned antennas, which is specifically as follows:

the above-mentioned method further includes:

performing the following polling operation on all parasitic antennas in mirror symmetry via the active antenna by use of the reactance control circuit: setting $jX_i = L1$, $jX'_i = L2$, wherein $jX_i$ and $jX'_i$ respectively represent the reactance of the ith pair of parasitic antennas in mirror symmetry of a transmitting end, and L1 and L2 represent reactance values which are set unequally; the reactance values corresponding to the rest parasitic antennas in mirror symmetry are respectively equal, so that $$R_i = r_i \frac{s_2}{s_1} = r_i,$$

for sending pilot information $p_i(n)$ of the ith directivity diagram i to a receiving end; and then, setting $jX_i = L2$, $jX'_i = L1$, and the reactance values corresponding to the rest parasitic antennas in mirror symmetry are respectively equal, so that $$R_i = r_i \frac{s_2}{s_1} = -r_i,$$

for sending pilot information $p'_i(n)$ of the ith mirror directivity diagram to the receiving end.

Further, the above-mentioned method further includes: receiving the directivity diagram index i* of maximum channel capacity fed back by the receiving end via a receiving apparatus, wherein the directivity diagram index i* is obtained in the following manner: estimating the channel information of each directivity diagram i and the mirror images thereof according to the $p_i(n)$ and $p'_i(n)$ received by the receiving end, and calculating channel information of two basis functions corresponding to the respective directivity diagrams i and the mirror images to obtain the channel capacity of the respective directivity diagrams i, so as to obtain the directivity diagram index i* of the optimal channel capacity; wherein the $p_i(n)$ represents the pilot information of the ith directivity diagram i, and the $p'_i(n)$ represents the pilot information of the ith mirror directivity diagram.

Further, a solution of obtaining the diversity gains at the transmitting end may be specifically as follows:

adjusting $jX_{i*}$, $jX'_{i*}$ and $jX_i = jX'_i$, $\forall i \neq i*$ via the reactance control circuit according to the directivity diagram index i* of the maximum channel capacity from the receiving end and the two paths of input data $s_1$ and $s_2$, to obtain $$R_{i*} = r_{i*} \frac{s_2}{s_1}.$$

The meaning of the mathematical expression in the adjustment of $jX_{i*}$, $jX'_{i*}$ and $jX_i = jX'_i$, $\forall i \neq i*$ is as follows: adjusting the parasitic reactance $jX_{i*}$ and $jX'_{i*}$ of a pair of parasitic antennas corresponding to i* to make the reactance values of the above-mentioned pair of parasitic antennas be unequal; and adjusting the reactance of the other parasitic antennas excluding the pair of parasitic antennas corresponding to i*, to make the reactance values of the parasitic antennas in mirror symmetry via the active antenna in the above-mentioned other parasitic antennas be respectively equal.

Figure 8:
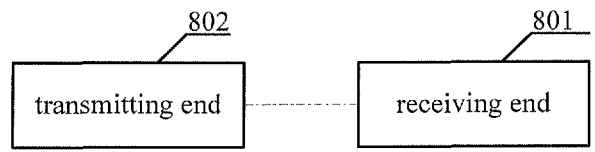
FIG. 8 is a schematic diagram of a structure of an antenna system in an embodiment of the present disclosure.

An embodiment of the present disclosure further provides an antenna system of a single radio frequency double-stream transmission apparatus, as shown in FIG. 8, including: a receiving end 801 and a transmitting end 802, wherein the transmitting end 802 is any single radio frequency double-stream transmission apparatus provided by the embodiments of the present disclosure; and the receiving end 801 at least includes two active antennas, and the active antennas are both connected with a radio frequency link.

As shown in FIG. 4, the transmitting end is of an ESPAR dipole array structure with 5 units and includes one active antenna and 4 parasitic antennas, wherein the parasitic antennas are respectively connected with corresponding parasitic reactors $jX_1$-$jX_4$, the distance between each parasitic antenna and the active antenna is d, and the adjacent radian of the adjacent parasitic antennas is 90 degrees. The ESPAR antenna with 5 units may simultaneously transmit three data streams, but will suffer the same problem as the ESPAR antenna with 3 units in the prior art and could not balance the power of the basis functions. However, if being used for transmitting two data streams, the ESPAR antenna with 5 units may not only balance the power of the basis functions, but also reduce the adjustable range of the reactance, thereby reducing the complexity of the reactance control circuit. How to achieve the technical effects specifically has been illustrated in detail in the foregoing embodiments, and will not be repeated redundantly herein.

Further, it can be seen from the analysis of the foregoing ESPAR dipole array with 5 units that, the two paths of data streams may be both transmitted by adjusting $jX_1$, $jX_2$ and $jX_3 = jX_4$ and by adjusting $jX_3$, $jX_4$ and $jX_1 = jX_2$. The directivity diagram of a transmitting antenna and the mirror image thereof will be changed if it is ensured that the reactance values of which pair of parasitic antennas in mirror symmetry via the active antenna are unequal and the reactance values of the rest parasitic antennas in mirror symmetry via the active antenna are respectively equal. If $jX_1$, $jX_2$ and $jX_3 = jX_4$ are adjusted, we may obtain the directivity diagram 1 and the mirror image thereof; correspondingly, if $jX_3$, $jX_4$ and $jX_1 = jX_2$ are adjusted, we may obtain the directivity diagram 2 and the mirror image thereof. The present disclosure further provides an embodiment of how to select a directivity diagram for transmission to obtain a directivity diagram diversity gain. In order to obtain the directivity diagram diversity gain, an embodiment of the present disclosure specifically provides the following solution: the reactance control circuit of the transmitting end 802 is further configured to adjust $jX_{i*}$, $jX'_{i*}$ and $jX_i=jX'_i$ $\forall i \neq i*$ according to the directivity diagram index $i*$ of the maximum channel capacity from the receiving end 801 and the two paths of input data $s_1$ and $s_2$, to obtain $$R_{i*} = r_{i*}\frac{s_2}{s_1}.$$

The above-mentioned receiving end 801 is configured to estimate the directivity diagrams i and the channel information of the mirror images thereof according to the $p_i(n)$ and $p'_i(n)$ received from the transmitting end 802, and calculate the channel information of two basis functions corresponding to the respective directivity diagrams i and mirror images thereof to obtain the channel capacity of the directivity diagrams i, so as to obtain the directivity diagram index $i*$ of the optimal channel capacity; wherein the $p_i(n)$ represents the pilot information of the ith directivity diagram i, and the $p'_i(n)$ represents the pilot information of the ith mirror directivity diagram. It should be noted that, in the above-mentioned antenna embodiments, the division of the included units is only a logic function division, but is not limited to the above-mentioned division, as long as corresponding functions can be achieved; in addition, the specific titles of the functional units are merely used for mutually distinguishing conveniently, rather than limiting the protection scope of the present disclosure. In addition, those of ordinary skill in the art may understand that all or a part of the steps in the above-mentioned method embodiments may be implemented by a program instructing corresponding hardware, the corresponding program may be stored in a computer readable storage medium, and the above-mentioned storage medium may be a read only memory, a magnetic disk or an optical disk or the like.

The foregoing descriptions are merely preferred embodiments of the present disclosure, rather than limiting the protection scope of the present disclosure. Any skilled one who is familiar with this art could readily think of variations or substitutions within the disclosed technical scope of the present disclosure, and these variations or substitutions shall fall within the protection scope of the present disclosure. Accordingly, the protection scope of the claims should prevail over the protection scope of the present disclosure.

What is claimed is:

1. A single radio frequency double-stream transmission apparatus, comprising:
   a radio frequency link, a reactance control circuit, a parasitic reactor, an active antenna and an even number M of parasitic antennas, wherein M is larger than 2;
   the radio frequency link is configured to generate a radio frequency signal; wherein:
   the active antenna is connected with the radio frequency link, the parasitic antennas are respectively connected with the parasitic reactor, distances from respective parasitic antennas to the active antenna are the same, and angular spacing between adjacent parasitic antennas is $$\frac{360}{M} \text{ degrees;}$$

and
   the reactance control circuit is configured to adjust the parasitic reactor to make reactance values of any one pair of parasitic antennas in mirror symmetry around the active antenna be different and reactance values of remaining pairs other than the respective any one pair of parasitic antennas in mirror symmetry around the active antenna be equal.

2. The apparatus of claim 1, wherein
   a data stream $s_1$ is loaded onto the active antenna through the radio frequency link for transmitting; and
   the reactance control circuit adjusts the reactance values of the respective parasitic antennas according to input of two paths of data streams $s_2$ and $s_1$, for making the reactance values of the $i^{th}$ pair of parasitic antennas in mirror symmetry around the active antenna be different and the reactance values of the remaining parasitic antennas be equal respectively, in order to make $$R_i = r_i \frac{s_2}{s_1};$$

wherein $R_i$ represents an adjustment coefficient, a parameter $r_i$ is used for ensuring equal power of two paths of basis functions $B_0(\theta)$ and $B_i(\theta)$, namely $P(B_0(\theta))=r_i^2 P(B_i(\theta))$; wherein $P(B_0(\theta))$ represents power of a basis function $B_0(\theta)$; $P(B_i(\theta))$ represents power of a basis function $B_i(\theta)$; and $B_0(\theta)$ and $B_i(\theta)$ respectively represent two paths of orthogonal waveform basis functions unfolded for far fields of the antennas.

3. The apparatus of claim 2, wherein
   the reactance control circuit is further configured to perform following polling operation on all pairs of parasitic antennas in mirror symmetry around the active antenna: setting $jX_i=L1$, $jX'_i=L2$, wherein $jX_i$ and $jX'_i$ respectively represent reactance of an $i^{th}$ pair of parasitic antennas in mirror symmetry around the active antenna, and L1 and L2 represent reactance values which are set unequally; the reactance values corresponding to the remaining parasitic antennas in mirror symmetry are respectively equal, so that $$R_i = r_i \frac{s_2}{s_1} = r_i,$$

for sending pilot information $p_i(n)$ of an $i^{th}$ directivity diagram to a receiving end; and then, setting $jX_i=L2$, $jX'_i=L1$, and the reactance values corresponding to the remaining parasitic antennas in mirror symmetry are respectively equal, so that $$R_i = r_i \frac{s_2}{s_1} = -r_i,$$

for sending pilot information $p'_i(n)$ of the $i^{th}$ mirror directivity diagram to the receiving end.

4. The apparatus of claim 3, further comprising:
a receiving apparatus, configured to receive a directivity diagram index i* of maximum channel capacity fed back by the receiving end, wherein the directivity diagram index i* is obtained in the following manner: estimating channel information of respective directivity diagrams i and mirror images thereof according to the $p_i(n)$ and $p'_i(n)$ received by the receiving end, and calculating channel information of two basis functions corresponding to the respective directivity diagrams i and the mirror images thereof to obtain channel capacity of the respective directivity diagrams i, so as to obtain the directivity diagram index i* of the optimal channel capacity; wherein the $p_i(n)$ represents the pilot information of the $i^{th}$ directivity diagram i, and the $p'_i(n)$ represents the pilot information of the $i^{th}$ mirror directivity diagram.

5. The apparatus of claim 4, wherein
the reactance control circuit is further configured to adjust $jX_{i*}$, $jX'_{i*}$ and $jX_i=jX'_i$, $\forall i \neq i*$ according to the directivity diagram index i* of the maximum channel capacity from the receiving end and the two paths of input data $s_1$ and $s_2$, to make $$R_{i*} = r_{i*}\frac{s_2}{s_1}.$$

6. An antenna system of a single radio frequency double-stream transmission, comprising: a receiving end and a transmitting end, wherein the transmitting end is the single radio frequency double-stream transmission apparatus of claim 1; and
the receiving end at least comprises two active antennas, and the active antennas are connected with the radio frequency link.

7. The antenna system of claim 6, wherein if the transmitting end is the single radio frequency double-stream transmission apparatus of claim 5,
the receiving end is configured to estimate the channel information of the respective directivity diagrams i and the mirror images thereof according to the $p_i(n)$ and $p'_i(n)$ received from the transmitting end, and calculate the channel information of two basis functions corresponding to the respective directivity diagrams i and the mirror images thereof to obtain the channel capacity of the directivity diagrams i, so as to obtain the directivity diagram index i* of the optimal channel capacity; wherein $p_i(n)$ represents the pilot information of the $i^{th}$ directivity diagram i, and the $p'_i(n)$ represents the pilot information of the $i^{th}$ mirror directivity diagram.

8. A method of a single radio frequency double-stream transmission apparatus, comprising:
providing a single radio frequency double-stream transmission apparatus, wherein the single radio frequency double-stream transmission apparatus comprises: an active antenna connected with a radio frequency link, a radio frequency link, a reactance control circuit, a parasitic reactor, an active antenna and an even number M of parasitic antennas, wherein M is larger than 2; the active antenna is connected with the radio frequency link, the parasitic antennas are respectively connected with the parasitic reactor, distances from respective parasitic antennas to the active antenna are the same, and angular spacing between adjacent parasitic antennas is $$\frac{360}{M} \text{ degrees;}$$

and
adjusting the parasitic reactor through the reactance control circuit to make reactance values of any one pair of parasitic antennas in mirror symmetry around the active antenna be different and reactance values of the remaining pairs other than the respective any one of parasitic antennas in mirror symmetry around the active antenna be equal.

9. The method of claim 8, further comprising:
loading a data stream $s_1$ onto the active antenna through the radio frequency link for transmitting; and
adjusting the reactance values of the parasitic antennas via the reactance control circuit according to input of two paths of data streams $s_2$ and $s_1$, for making the reactance values of an $i^{th}$ pair of parasitic antennas in mirror symmetry around the active antenna be different and the reactance values of the remaining parasitic antennas be equal respectively, in order to make $$R_i = r_i\frac{s_2}{s_1},$$

wherein $R_i$ represents an adjustment coefficient, a parameter $r_i$ is used for ensuring equal power of two paths of basis functions $B_0(\theta)$ and $B_i(\theta)$, namely $P(B_0(\theta))=r_i^2 P(B_i(\theta))$; wherein $P(B_0(\theta))$ represents power of a basis function $B_0(\theta)$; $P(B_i(\theta))$ represents power of a basis function $B_i(\theta)$; and $B_0(\theta)$ and $B_i(\theta)$ respectively represent two paths of orthogonal waveform basis functions unfolded for far fields of the antennas.

10. The method of claim 9, further comprising:
performing following polling operation on all pairs of parasitic antennas in mirror symmetry around the active antenna by using the reactance control circuit: setting $jX_i=L1$, $jX'_i=L2$, wherein $jX_i$ and $jX'_i$ respectively represent reactance of the $i^{th}$ pair of parasitic antennas in mirror symmetry of a transmitting end, and L1 and L2 represent reactance values which are set unequally; the reactance values corresponding to the remaining parasitic antennas in mirror symmetry are respectively equal, so that $$R_i = r_i\frac{s_2}{s_1} = r_i,$$

for sending pilot information $p_i(n)$ of an $i^{th}$ directivity diagram i to a receiving end; and then, setting $jX_i=L2$, $jX'_i=L1$, and the reactance values corresponding to the remaining parasitic antennas in mirror symmetry are respectively equal, so that $$R_i = r_i\frac{s_2}{s_1} = -r_i,$$

for sending pilot information $p'_i(n)$ of the $i^{th}$ mirror directivity diagram to the receiving end.

11. The method of claim 10, further comprising:
receiving a directivity diagram index i* of maximum channel capacity fed back by the receiving end via a receiving apparatus, wherein the directivity diagram index i* is obtained in the following manner: estimating channel information of respective directivity diagrams i and mirror images thereof according to the $p_i(n)$ and $p'_i(n)$ received by the receiving end, and calculating channel information of two basis functions corresponding to the respective directivity diagrams i and the mirror images thereof to obtain channel capacity of the respective directivity diagrams i, so as to obtain the directivity diagram index i* of the optimal channel capacity; wherein $p_i(n)$ represents pilot information of the $i^{th}$ directivity diagram i, and $p'_i(n)$ represents pilot information of the $i^{th}$ mirror directivity diagram.

12. The method of claim 11, further comprising:
adjusting $jX_{i^*}$, $jX'_{i^*}$ and $jX_i = jX'_i$ $\forall i \neq i^*$ via the reactance control circuit according to the directivity diagram index i* of the maximum channel capacity from the receiving end and the two paths of input data $s_1$ and $s_2$, to make $$R_{i^*} = r_{i^*} \frac{s_2}{s_1}.$$

* * * * *